June 9, 1959   W. LOHS ET AL   2,890,447
ELECTROMAGNETIC DRIVE SYSTEM FOR RELAYS, RINGERS AND THE LIKE
Filed June 21, 1956
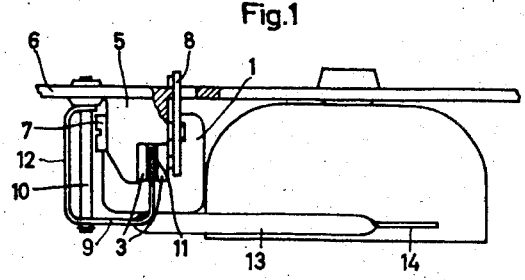
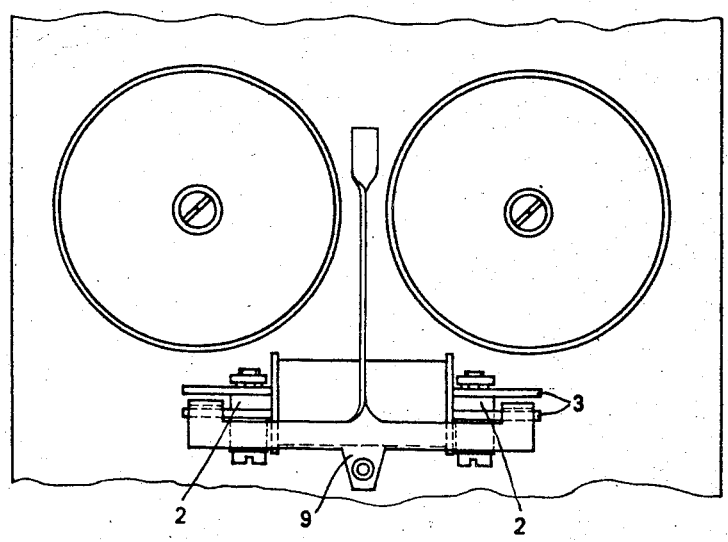
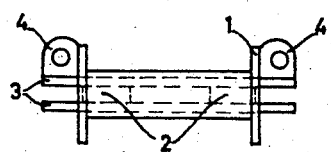 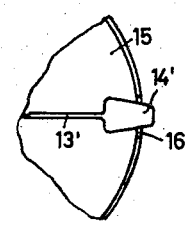 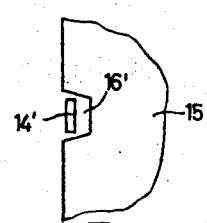
Inventors.
Willy Lohs,
Walter Paul, &
Albert Geese.

United States Patent Office 2,890,447
Patented June 9, 1959

2,890,447

ELECTROMAGNETIC DRIVE SYSTEM FOR RELAYS, RINGERS AND THE LIKE

Willy Lohs, Walter Paul, and Albert Geese, Munich, Germany, assignors to Siemens & Halske Aktiengesellschaft, Berlin and Munich, Germany, a corporation of Germany Application June 21, 1956, Serial No. 592,775

5 Claims. (Cl. 340—392)

This invention is concerned with an electromagnetic drive system for relays, ringers and the like, controlled by alternating current, comprising two parallel disposed soft iron parts for producing a magnet system forming two pairs of poles, and at least one permanent magnet disposed between said soft iron parts.

Known drive systems of this kind occasion manufacturing difficulties due to the use of rectangularly shaped soft iron parts and the assembly of the movable system comprising a plurality of individual elements.

The object of the invention is to reduce the manufacturing costs by simplifying the individual system elements and providing a space-saving structure while keeping the advantages of a four-pole system in which the magnetic forces acting upon the armature are utilized in all four poles for the motion thereof, and requiring as in known systems only one coil.

This object is realized by forming the two parallel soft iron parts in the manner of flat rectilinear bars of rectangular cross-section, the free ends of the soft iron parts forming the poles. The soft iron parts are suitably slipped into the coil body together with the permanent magnet or magnets and held in the desired positions by clamps or by beads of the coil spool disks.

In accordance with another feature of the invention, the soft iron parts and the permanent magnet or magnets are directly embedded in the coil spool body by insertion thereof in a suitable mold and spraying therearound the coil spool material consisting preferably of a synthetic material. The clamping or beading is in this manner avoided. It is particularly suitable to form the securing elements for the unit incident to forming it by spraying.

Another advantage as compared with known drive systems in which the movable element is assembled of a plurality of individual parts which are held together by screws, rivets and the like, is obtained by making the armature, the armature journal, clapper and clapper weight of one punched part. It is in this manner possible to make the movable system part in a single operation, requiring a further beading operation only in special cases when the drive system needs an angular disposition of the corresponding punched part.

Still another advantage flows from the omission of fastening means of any kind or overlapping of individual parts resulting in a considerable reduction of weight of the movable system. Such weight reduction affects favorably the sensitivity of the drive system and permits as compared with known arrangements use of smaller electromagnetic coils.

The invention will now be described with reference to the accompanying drawing, in which Fig. 1 shows as an example of the invention an embodiment of a ringer system;

Fig. 2 shows the ringer system of Fig. 1 in elevational view;

Fig. 3 indicates a diecast unit comprising a coil spool body, a permanent magnet and the soft iron parts forming the yokes and poles as well as the fastening ears; and Figs. 4 and 5 illustrate a trapezoidal clapper.

Referring now to the drawing, numeral 9 indicates an armature forming a clapper 13 which is integral therewith, the clapper weight 14 being disposed for motion between two bells. One of the bells has been omitted from Fig. 1 to keep the drawing simple. The spool body 1 carrying a winding, together with the soft iron parts 3 forming the yoke and the permanent magnet 2 disposed therebetween, rests in two mountings of the base plate 6 and is fastened thereto by means of screws 7 and clamping members 8. The armature 9 is journalled upon a pin 10 secured to the base 6 and two ears 11 bent therefrom project into the spaces between the ends of the poles of the two pole pairs formed by the soft iron parts 3. The clapper rod 13 is twisted by 90° to stiffen it against vertical loading.

The diecast unit shown in Fig. 3 comprises the coil spool body 1, the permanent magnet 2, the soft iron parts forming the yokes and the pole pieces, and the fastening ears or flanges 4. Insertion of this unit into the mountings 5 shown in Figs. 1 and 2 avoids the use of the clamping members 8 shown therein. The fixing of the soft iron parts 3 and the permanent magnets 2 in the coil spool body, by a separate operation, is also avoided.

The drive system may of course be used for a one bell ringer. In such a case, the clapper weight 14' will preferably be in trapezoidal form as shown in Fig. 4, oscillating within a cutout 16 of the bell shell 15. The impact of the clapper may be regulated by forming an elongated hole for the mounting of the bell shell and shifting it in the direction of the clapper rod. Provision of a trapezoidal cutout 16' in the bell provides another kind of impact regulation by vertical shifting of the bell or of the clapper weight; the configuration of the clapper weight may in such case be as desired. The clapper weight may in either case be adjusted centrally relative to the cutout by rotation of the bell shell about the axis of the corresponding fastening screw.

The invention has been shown in connection with a ringer but is of course not inherently limited thereto as it may be applied to equal advantage in relays and the like. The term "ringer" is accordingly to be interpreted with sensible latitude.

Changes may be made within the scope and spirit of the appended claims.

We claim:

1. An alternating current electromagnetic drive structure comprising a magnetic circuit including two spaced cooperable soft iron pole pieces, permanent magnet means disposed between and magnetically polarizing said pole pieces, a magnetic field-producing coil structure encircling and supporting said pole pieces and permanent magnet means in operative position with the free ends of the respective pole pieces extending beyond the coil structure in opposed relation, and an armature, positioned at the exterior of said coil structure, pivoted on an axis which is transverse to the axis of said coil structure and said pole pieces, and symmetrically positioned with respect to the respective end portions of the pole pieces, said armature extending transversely from the pivotal axis in opposite directions to the ends of said pole pieces with the free ends of said armature being disposed in generally parallel relation between the poles formed by the end portions of said pole pieces, said coil being operative, upon the passage of alternating current therethrough, to produce a magnetic field which will alternately reinforce opposite poles of each pair of said pole pieces, resulting in vibratory movement of said armature.

2. An alternating current electromagnetic drive structure according to claim 1, wherein said pole pieces are each in the form of a straight member of rectangular cross section and arranged in spaced parallel relation.

3. An alternating current electromagnetic drive structure as defined in claim 1, wherein said soft iron pole pieces and permanent magnet means are inserted into the coil structure and secured in place by deforming the end portions of the latter.

4. An alternating current electromagnetic drive structure as defined in claim 1, wherein said soft iron pole pieces and permanent magnet means are embedded in the mass of the coil structure.

5. An alternating current electromagnetic drive structure as defined in claim 1, wherein the armature is provided at its ends with ears extending perpendicularly therefrom, such ears each having a right angle bend therein with the free ends of such ears being disposed between respective pairs of poles formed by the end portions of said pole pieces.

References Cited in the file of this patent

UNITED STATES PATENTS

| | | |
|---|---|---|
| 869,885 | Drew | Nov. 5, 1907 |
| 2,006,363 | McTwiggan | July 2, 1935 |
| 2,433,739 | Collins et al. | Dec. 30, 1947 |

FOREIGN PATENTS

| | | |
|---|---|---|
| 473,699 | Germany | Mar. 30, 1929 |